United States Patent [19]

Capuano

[11] 4,432,681
[45] Feb. 21, 1984

[54] FASTENER

[75] Inventor: Terry D. Capuano, Hinckley, Ohio

[73] Assignee: Russell Burdsall & Ward Corporation, Mentor, Ohio

[21] Appl. No.: 268,067

[22] Filed: May 28, 1981

[51] Int. Cl.³ .................... F16B 37/04; F16B 39/00
[52] U.S. Cl. .................................... 411/180; 411/188
[58] Field of Search ............. 411/105, 107, 108, 179, 411/180, 181, 183, 184, 185, 186, 187, 188, 189

[56] References Cited

U.S. PATENT DOCUMENTS

| | | | |
|---|---|---|---|
| 1,112,525 | 10/1914 | Darling | 411/181 X |
| 1,759,339 | 5/1930 | Andren | 411/180 |
| 2,486,769 | 11/1949 | Watson, Jr. | |
| 2,741,289 | 4/1956 | Grow | |
| 3,078,900 | 2/1963 | Walker | 411/181 |
| 3,127,919 | 4/1964 | Swanstrom | |
| 3,133,579 | 5/1964 | Grimm et al. | 411/180 |
| 3,204,679 | 9/1965 | Walsh | |
| 3,213,914 | 10/1965 | Baumle et al. | |
| 3,253,631 | 5/1966 | Reusser | |
| 3,399,705 | 9/1968 | Breed et al. | |
| 3,640,326 | 2/1972 | Brown | 411/188 |
| 3,736,969 | 6/1973 | Warn et al. | 411/179 |
| 3,750,525 | 8/1973 | Waters et al. | |
| 3,782,436 | 1/1974 | Steiner | |
| 3,813,179 | 5/1974 | Priest | |
| 3,910,331 | 10/1975 | Randall | |
| 3,967,669 | 7/1976 | Egner | |

FOREIGN PATENT DOCUMENTS 3015078 11/1980 Fed. Rep. of Germany .
492137 6/1968 Switzerland .

Primary Examiner—Thomas J. Holko
Attorney, Agent, or Firm—Yount & Tarolli

[57] ABSTRACT

An improved fastener has a head section and an axially extending shank section. A thread convolution is disposed in a coaxial relationship with the head and shank sections. An improved holding action against rotational and axial movement of the fastener relative to a metal base member is promoted by a plurality of radially extending wedge-shaped compression ramps. The compression ramps are disposed on the head section and slope radially and axially inwardly toward the shank section. The compression ramps are effective to force metal of the base member into an annular groove which circumscribes and undercuts at least a portion of the shank section. The metal which is received in the undercut portion of the groove is effective to hold the fastener against being pushed or pulled axially outwardly from the base member. The compression ramps also force the metal of the base member radially inwardly against corners formed on the shank section of the fastener to hold the fastener against rotation. In addition, the compression ramps are embedded in the base member to further hold the fastener against rotation relative to the base member. The compression ramps are separated by flat arcuate stop surface areas which limit the extent to which the fastener is pressed into the base member.

10 Claims, 7 Drawing Figures

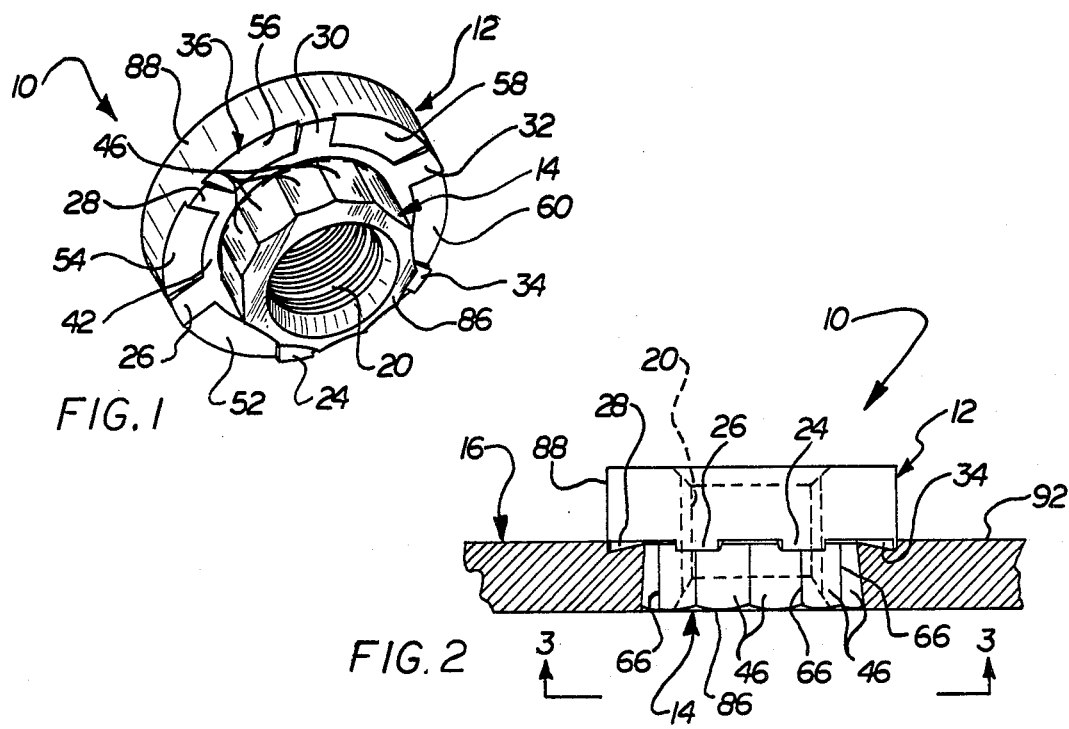
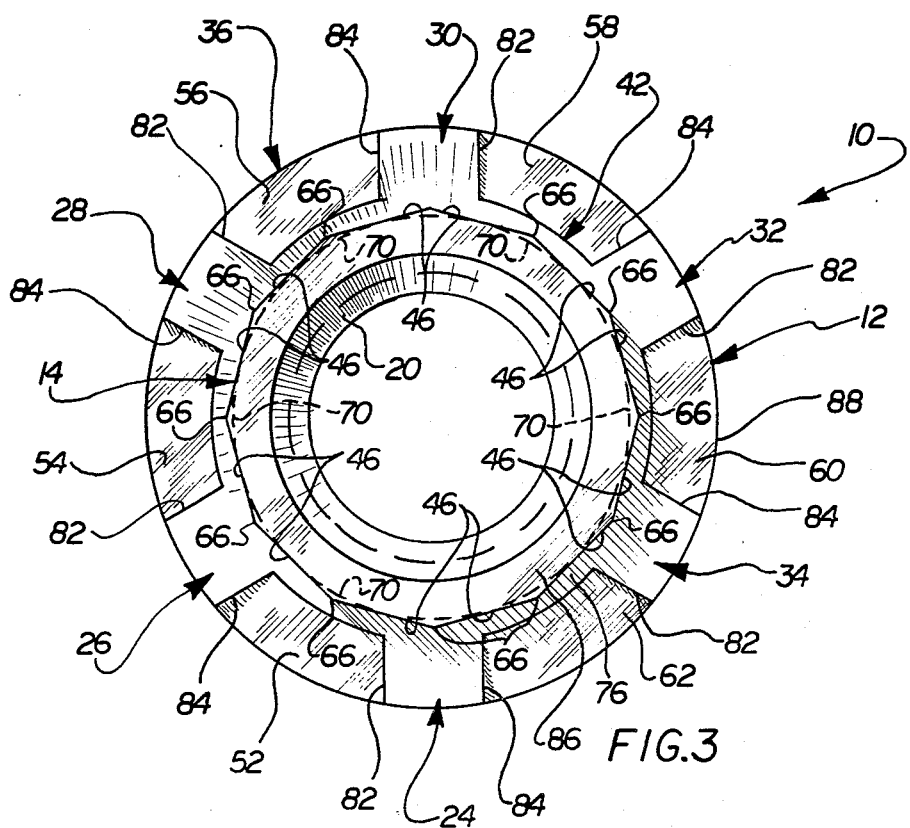

FASTENER

BACKGROUND OF THE INVENTION

The present invention relates to a new and improved fastener which is held against axial and rotational movement relative to a base member by an interaction between the base member and the fastener.

A known fastener which is received in a base member and held against axial and rotational movement relative to the base member is disclosed in U.S. Pat. No. 3,399,705. This known fastener includes a head section and an axially extending shank section. An indenting flange is formed on the head section to cause metal of a base member to be forced radially inwardly to grip a polygonal shank of the fastener. This holds the fastener against rotational movement relative to the base member. The fastener is held against axial movement relative to the base member by a bulge formed on the shank section of the fastener.

This known fastener is generally satisfactory in its mode of operation. However, it is desirable to enhance the rotation resisting or torque out characteristics of the known fastener. In addition, it is desirable to increase the ability of the known fastener to resist axial movement.

SUMMARY OF THE PRESENT INVENTION

The present invention provides a fastener which is received in a base member and interacts with the base member in such a manner as to provide an improved holding action resisting axial and rotational movement of the fastener. To provide for this improved holding action, a head section of the fastener has a plurality of radially extending compression ramps. When the fastener is inserted into the metal base member, the compression ramps force metal radially inwardly toward an axially extending shank section of the fastener. As the metal flows radially inwardly, it enters an annular groove which undercuts at least a portion of the shank section of the fastener. The metal which is received in the undercut groove provides an improved holding action resisting axial movement or push out of the fastener from the base member.

In addition to improving the resistance of the fastener to axial movement or push out, the compression ramps interact with the base member to improve the resistance of the fastener to rotational movement or torque out. To this end, the compression ramps are effective to force the metal of the base member firmly inwardly against side surfaces formed on the shank of the fastener. In addition, the axially projecting compression ramps are embedded in the base the member to increase the rotational holding action between the fastener and the member. Flat arcuate stop surfaces are provided between the compression ramp to limit the extent to which the fastener is forced into the base member.

Accordingly, it is an object of this invention to provide a new and improved fastener which is received in a base member and has an improved resistance to rotational and axial movement relative to the base member.

Another object of this invention is to provide a new and improved fastener which is held against rotational and axial movement relative to a base member by the effect of compression ramps which force material of the base member into a groove around a shank of the fastener, force material of the base member against side surfaces of the shank of the fastener, and become embedded in the base member.

BRIEF DESCRIPTION OF THE DRAWINGS

The foregoing and other objects and features of the present invention will become more apparent upon a consideration of the following description taken in connection with the accompanying drawings wherein:

FIG. 1 is a pictorial illustration of one specific preferred embodiment of a fastener constructed in accordance with the present invention;

FIG. 2 is fragmentary sectional view illustrating the manner in which the fastener of FIG. 1 is received in a sheet metal base member;

FIG. 3 is an end view, taken on an enlarged scale along the line 3—3 of FIG. 2, illustrating the relationship between a plurality of radially extending compression ramps formed on a head section of the fastener, an annular groove, and an axially extending shank section of the fastener;

DESCRIPTION OF SPECIFIC PREFERRED EMBODIMENTS OF THE INVENTION

General Description

Figure 4:
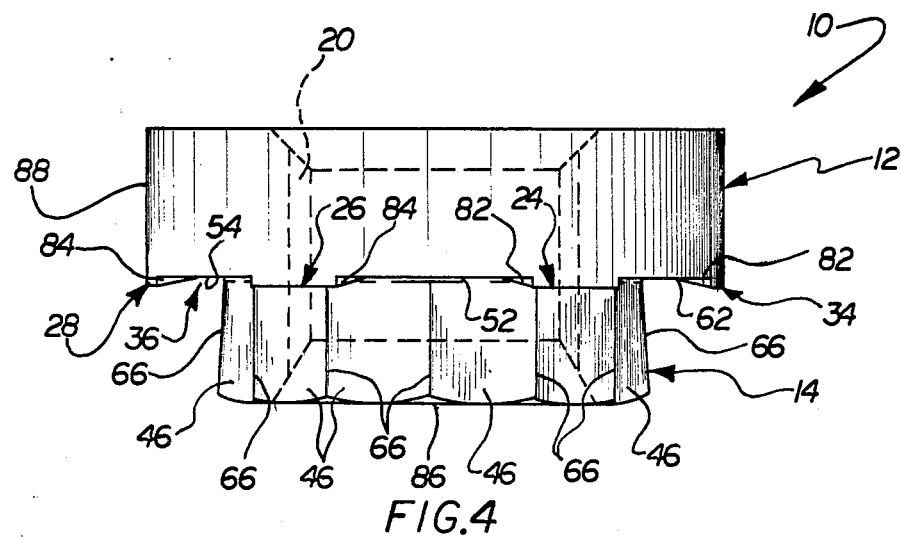
FIG. 4 is a side elevational view, generally similar to FIG. 2, further illustrating the relationship between the compression ramps and the head and shank sections of the fastener.

A fastener 10 constructed in accordance with the present invention is illustrated in FIG. 1 and includes a circular head section 12 and an axially extending shank section 14. When the fastener 10 is inserted into a sheet metal base member 16, the head and shank sections 12 and 14 cooperate with the base member to hold the fastener against both rotational and axial movement relative to the base member. The one piece metal fastener 10 is provided with an internal thread convolution 20 which extends through and is disposed in a coaxial relationship with the head and shank sections 12 and 14.

Although it is preferred to form the fastener 10 as a nut having an internal thread convolution 20, it is contemplated that the fastener could be formed as a bolt with an external thread convolution if desired. It is also contemplated that the fastener 10 may be used with a base member 16 formed of a material other than sheet metal if desired.

In accordance with one of the features of the present invention, a plurality of wedge shaped compression ramps 24, 26, 28, 30, 32 and 34 (see FIGS. 1 and 3) are provided to enhance the resistance of the fastener 10 to axial and rotational movement relative to the base member 16. To hold the fastener 10 against axial movement, the compression ramps 24–34 force metal of the base member 16 into an annular groove 42 (FIG. 3) which is formed in the rim portion 36 and circumscribes the shank section 14. To hold the fastener 10 against rotational movement, the compression ramps 24-34 force the metal of the base member 16 (FIG. 2) radially inwardly against axially extending side surfaces 46 on the shank section 14. To further hold the fastener 10 against axial movement, the compression ramps 24-34 are embedded in the base member 16.

In accordance with another feature of the present invention, a plurality of flat arcuate stop surfaces 52, 54, 56, 58, 60 and 62 (see FIG. 3) abuttingly engage the base member 16 to limit the extent to which the fastener 10 can be pressed into the base member. The stop surfaces 52-62 are disposed in an annular array on a rim portion 36 of the head section 12. Each of the compression ramps 24-34 is disposed between a pair of the stop surfaces 52-62. The stop surfaces 52-62 extend radially outwardly from the radially outer edge portion of the annular groove 42 and are disposed in a common flat plane which extends perpendicular to the central axis of the fastener 10. When the fastener 10 is forced into a sheet metal member 16 (FIG. 2) the top surfaces 52-62 abuttingly engage the sheet metal member to limit the extent to which the fastener can be pressed into the member.

Compression Ramp - Groove - Shank Relationship

The compression ramps 24-34 are disposed in a circular array which is located radially outwardly of and is coaxial with the annular groove 42 (FIG. 3). The annular groove 42 circumscribes and is coaxial with an axially inner end or base of the shank section 14. The annular groove 42 has an outside diameter which is greater than the outside diameter of the shank section 14 so that the groove extends outwardly of the shank section.

To enable the metal in the groove 42 to hold the fastener against axial movement, the shank section 14 is undercut (FIG. 5) at straight corners 66 formed at the intersection between flat side surfaces 46 on the shank section 14. The corners 66 and side surfaces 46 extend axially outwardly to an outer end portion of the shank section 14. The straight corners 66 flare axially outwardly from the groove 42 and away from each other to a slight bulge at the outer end portion of the shank section 14. The general configuration of the shank section 14 is similar to the configuration disclosed in U.S. Pat. No. 3,399,705. Each of the corners 66 is undercut at a radially inner portion 70 of the groove 42 (FIG. 5).

When the fastener 10 is pressed into the base member 16, the compression ramps 24-34 force metal radially inwardly into the undercut portions 70 of the groove 42. Although the undercut portions 70 at only one of the corners 66 on the shank section 14 has been shown in FIG. 5, it should be understood that there is a similar undercut 70 at each of the corners 66 (see FIG. 3). The metal which is trapped in the undercut portion 70 at each of the corners 66 on the shank 14 holds the fastener from being pushed or pulled axially outwardly from the sheet metal member 16.

The effectiveness of the compression ramps 24-34 in forcing metal into the undercut portions 70 at the corners 66 is enhanced by having each of the compression ramps radially aligned with one of the corners 66. In the illustrated embodiment of the invention there are more corners 66 than there are compression ramps 24-34. Thus, there are six compression ramps and twelve corners.

Figure 5:
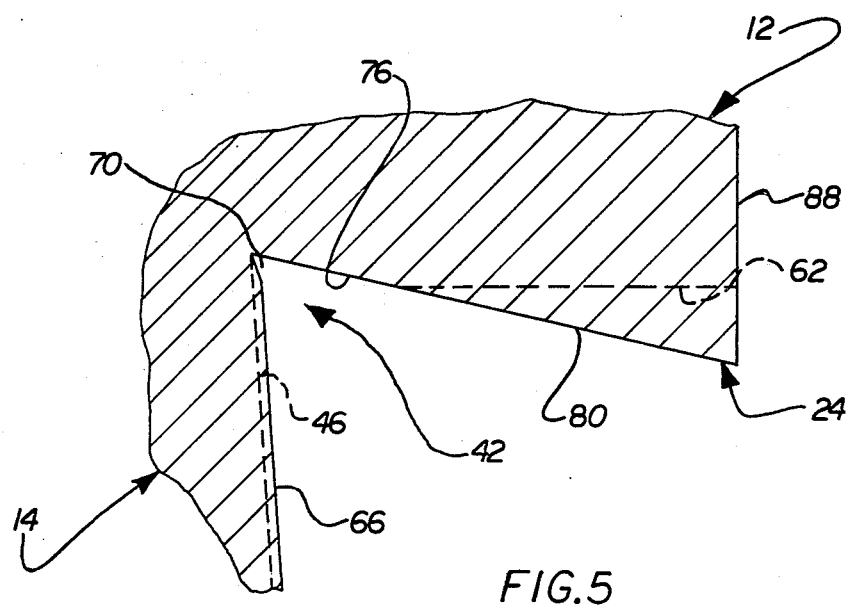
FIG. 5 is an enlarged fragmentary sectional view of a portion of the fastener of FIG. 4 and illustrating the manner in which the annular groove undercuts the shank section of the fastener and the manner in which a face surface of a compression ramp is formed as a continuation of a side of the annular groove.
Figure 6:
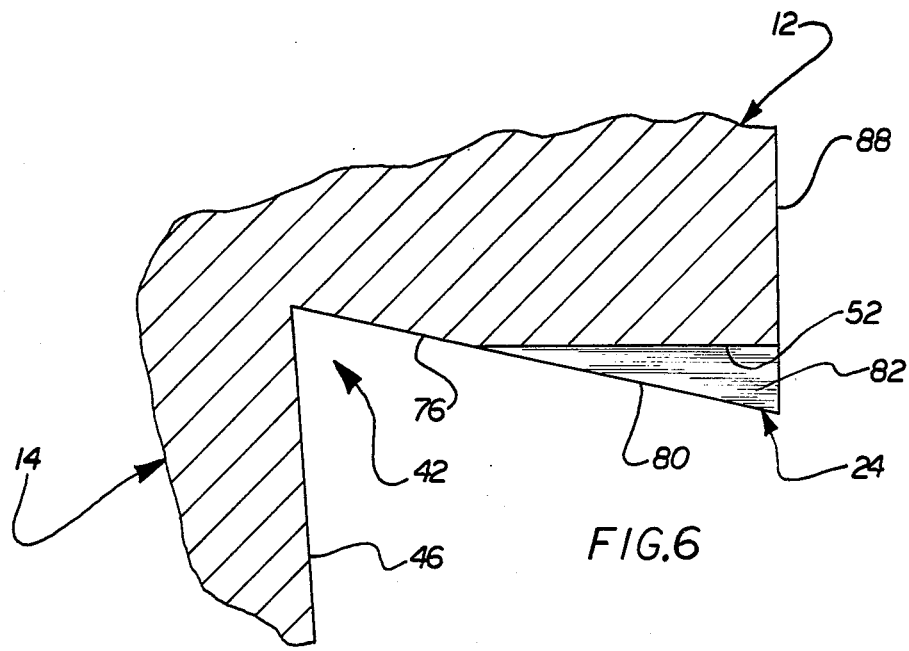
FIG. 6 is a fragmentary sectional view, generally similar to FIG. 5, illustrating the relationship between the annular groove, compression ramp and an arcuate stop surface on the head section of the fastener.

The flow of metal into the undercut portions 70 at the corners 66 which are not radially aligned with a compression ramp is promoted by forming the annular groove 42 with a radially and axially outwardly flaring side surface 76 (see FIGS. 5 and 6). The outwardly flaring side surface 76 forms the frustum of a right circular cone having a central axis coincident with the central axis of the fastener. Therefore, when the fastener is forced into the sheet metal base member 16, the side surface 76 of the groove 42 tends to promote a flow of metal into the undercut of the corners 66 which are not disposed radially inwardly of one of the compression ramps 24-34.

In order to minimize the extent to which the shank section 14 is weakened by the formation of the groove 42, the groove 42 has a depth such that the shank section is undercut only at the corners 66. Thus, the groove 42 extends tangentially to the flat side surface 46 of the shank 14 at a location midway between the corners 66 (see FIG. 6). Therefore, flat side surfaces 46 on the shank section 14 extend to the bottom or axially innermost end of the groove 42 at a location midway between the corners 66.

Although the central portions of the flat side surfaces 46 extend to the bottom of the annular groove 42, the corners 66 on the shank section 14 terminate short of the bottom or axially innermost portion of the groove 42 to provide for the undercut 70 (see FIG. 5). This enables a tapered body of metal to be trapped beneath each of the corner portions 66 of the shank section 14 (FIGS. 3 and 5). The metal which is trapped in the undercuts 70 at each of the corners 66 hold the shank section 14 against axial movement relative to the base member 16. If it was desired to further enhance the ability of the fastener 16 to resist axial load forces, the groove 42 could be extended radially inwardly so that the shank section 14 would be undercut completely around its base or axially inner end portion. This would result in the undercut portion 70 extending throughout a complete circle to thereby increase the amount of metal which can be pressed into the undercut portion 70 by the combined influence of the compression ramps 24-34 and the sloping side surface 76 of the annular groove. It is contemplated that it may be preferred to extend the undercut 70 completely around the shank section 14 in order to increase the axial holding action. When this is done, the wedging action of the sloping side surface 76 becomes particularly important in order to completely fill the annular undercut with metal of the base member 16.

Regardless of the radial depth to which the groove 42 is formed, the annular groove has an outside diameter which is greater than the maximum outside diameter of the shank section 14. This enables the side surface 76 of the groove 42 to compress the metal of the base member 16 radially inwardly into the groove. In order to provide for an undercut 70, the groove must have an inside diameter which is less than the diameter of a circle which extends through the corners 66 on the shank section 14.

Compression Ramps

The compression ramps 24-34 are aligned with corners 66 of the shank section 14 and are shaped to force metal radially inwardly into the undercuts 70 and to force metal against the flat side surfaces 46 on the shank 14. Each of the compression ramps 24-34 has a wedge shaped configuration (see FIGS. 4 and 6). The wedge shaped compression ramps 24-34 have face or major side surfaces 80 which slope radially and axially outwardly from the annular groove 42. The face or side surfaces 80 are formed as a continuation of the side surface 76 of the annular groove. Thus, the face surface 80 on the compression ramp 24 extends at the same acute angle relative to the central axis of the fastener 10 as does the annular side surface 76 of the groove 42.

In one specific instance the included angle between the face surface 80 and the central axis of the fastener 10 was approximately 87.5 degrees. The compression ramps had an axial height from the plane of the stop surfaces 52–62 of approximately 0.026 inches. In this embodiment of the invention, the shank section 14 had a diameter of approximately 0.581 inches. Of course, the compression ramps 24–34 and side surface 76 of the annular groove 42 could be formed at a different angle and the compression ramps and shank section could have a different size if desired. It should be understood that the foregoing specific ramp surface angle, compression ramp height, and shank section diameter have been set forth herein for purposes of clarity of illustration and the present invention is not to be limited to any particular ramp surface angle, compression ramp height, or shank section diameter.

Each of the compression ramps 24–34 has a pair of wedge shaped parallel side surfaces 82 and 84 which extend generally radially outwardly from the annular groove 42 (see FIG. 3). The side surfaces 82 and 84 of the compression ramps 24–34 extend perpendicular to the stop surfaces 52–62 and parallel to the central axis of the fastener 10. The apex of each of the wedge shaped sides 82, 84 is located at the intersection of the side surface 76 of the groove 42 with one of the stop surfaces 52–62. The base of each of the wedge shaped side surfaces 82, 84 is located at a cylindrical peripheral surface 88 of the head section 12 and projects axially outwardly from the plane of the stop surfaces 52–62.

The compression ramps 24–34 are separated by the stop surfaces 52–62. The stop surfaces 52–62 each have the same arcuate extent. The arcuate extent of each of the stop surfaces 52–62 is at least twice as great as the arcuate extent of one of the compression ramps 24–34.

The stop surfaces 52–62 are disposed on the rim 86 in a circular array having a central axis which is coincident with the central axis of the annular groove 42 and with the central axis of the head and shank sections 12 and 14. The flat stop surfaces 52–62 extend radially outwardly from the arcuate outer edge of the annular groove 42 to the cylindrical peripheral side surface 66 of the head section 12. Each of the stop surfaces 52–62 faces toward an axially outer end of the shank section 14 and is disposed in a plane which extends perpendicular to the central axis of the shank section.

Mounting of the Fastener

When the fastener 10 is inserted into the sheet metal base member 16, a hole or opening is punched in the sheet member by the circular leading end surface 86 of the shank section 14. This hole has a generally circular configuration with a diameter which is the same as the diameter of a circle which would be inscribed within and extend tangentially to the flat side surfaces 46 of the polygonal shank section 14. Although it is contemplated that the leading end surface 86 of the fastener 10 will be used to punch the hole in the sheet metal base member 16, the hole could be prepunched if desired.

As the fastener is forced axially into the base member 16, the corners 66 on the shank section 14 are forced into the metal at the sides of the circular hole. This provides firm abutting engagement between the metal of the base member 16 and the flat side surfaces 46 on the shank section. The resulting firm abutting engagement of the metal of the member 16 with the side surfaces 46 holds the shank section 16 against rotation relative to the member 16.

Continued insertion of the fastener 10 into the metal member 16 results in engagement of the radially and axially outer edges of the compression ramps 24–34 with the base member 16. As insertion of the fastener is continued, the compression ramps 24–34 force the metal of the base member 16 to flow radially inward against the flat outwardly flaring side surfaces 46 on the shank section 14 and into undercut portions 70 of the annular groove 42. Simultaneously with the pressing of metal into the groove 42 by the compression ramps 24–34, the sloping side surface 76 on the annular groove tends to force metal into the bottom of the groove at locations which are radially inwardly from the stop surfaces 52–62 and offset from the compression ramps 24–34.

Axially inward movement of the fastener 10 into the sheet metal base member 16 is interrupted by engagement of the flat stop surfaces 52–62 with a side surface 92 (see FIG. 2) of the base member. Abutting engagement between the stop surfaces 52–62 and the side surface 92 of the sheet metal base member 16 prevents the fastener from being forced further into the base member 16 than desired.

At this time, the compression ramps 24–34 are embedded in the base member 16 and hold the fastener 10 against rotational movement relative to the sheet metal. In addition, the engagement of the member 16 with the flat side surfaces 46 on the shank section 14 holds the fastener against rotational movement. The fastener is firmly held against axial movement, that is being pulled upwardly (as viewed in FIG. 2), out of the hole in the sheet metal member 16 by the metal which has been forced into the undercut portions 70 of the annular groove 42 by the compression ramps 24–34.

Second Embodiment

Figure 7:
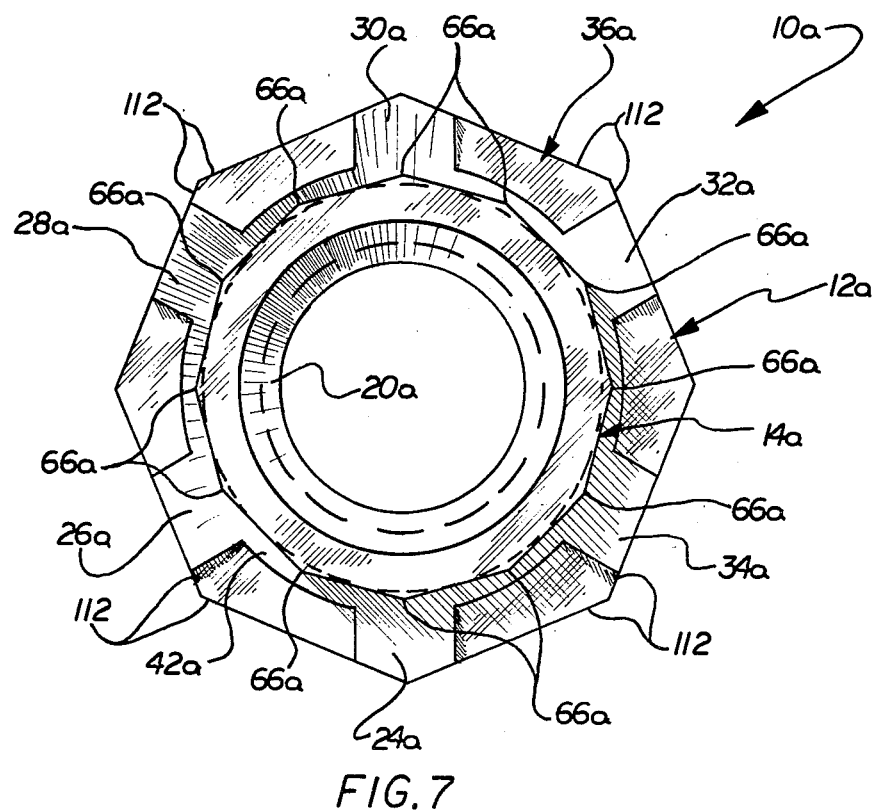
FIG. 7 is an end view, generally similar to FIG. 3, of a second embodiment of the fastener.

In the embodiment of the invention illustrated in FIGS. 1–6, the fastener 10 is formed with a circular head section 12. However, it is contemplated that the fastener could be formed with a polygonal head section in the manner shown in FIG. 7. Since the embodiment of the invention shown in FIG. 7 is generally the same as the embodiment of the invention shown in FIGS. 1–6, similar numerals will be utilized to designate similar components, the suffix letter "a" being associated with the numerals of FIG. 7 in order to avoid confusion.

A fastener 10a includes a polygonal head section 12a and an axially outwardly projecting shank section 14a. The head section 12a has a rim portion 36a which extends radially outwardly from the shank section 14a. A plurality of compression ramps 24a, 26a, 28a, 30a, 32a and 34a extend radially outwardly from an annular groove 42a which circumscribes a base or axially inner end of the shank section 14a. A thread convolution 20a extends through the head and shank sections 12a and 14a.

In accordance with a feature of this embodiment of the invention, the head section 12a is formed with flat side surfaces 112. The central axis of the polygonal head section 12a is coincident with a central axis of the shank section 14a and the annular groove 42a.

The compression ramps 24a–34a are located radially outwardly from axially extending corners 66a of the shank section 14a. The compression ramps 24a and 30a are aligned with corners of the polygonal head section 12a. However, the other compression ramps 26a, 28a, 32a and 34a intersect the flat side surfaces 112 of the head section.

The fastener 10a is advantageously made from a piece of cylindrical barstock. The barstock is formed in suitable dies to make the polygonal head sections 12a. If a compression ramp was located at each of the corners of the head section 12a, difficulty would be encountered in forming the fastener 10a due to a lack of material for the compression ramps and the corners. By having most of the compression ramps offset from the corners, the fabrication of the fastener 10a is facilitated. It should be noted, however, that the compression ramps 24a and 30a have greater moment arms and are therefore better able to resist rotational movement due to the fact that they are radially aligned with corners of the polygonal head section 12a.

Summary

In view of the foregoing description it is apparent that the present invention provides a fastener 10 which is received in a base member 16 and interacts with the base member in such a manner as to provide an improved holding action resisting axial and rotational movement of the fastener. To provide for this improved holding action, a head section 12 of the fastener 10 has a plurality of radially extending compression ramps 24-34. When the fastener 10 is inserted into the metal base member 16, the compression ramps force metal radially inwardly toward an axially extending shank section 14 of the fastener. As the metal flows radially inwardly, it enters an annular groove 42 which undercuts at least a portion of the shank section 14 of the fastener. The metal which is received in the undercut groove provides an improved holding action resisting axial movement or push out of the fastener from the base member.

In addition to improving the resistance of the fastener to axial movement or push out, the compression ramps 24-34 interact with the base member 16 to improve the resistance of the fastener to rotational movement or torque out. To this end, the compression ramps are effective to force the metal of the base member firmly inwardly against side surfaces 46 formed on the shank 14 of the fastener. In addition, the axially projecting compression ramps 24-34 are embedded in the base member 16 to increase the rotational holding action between the fastener and the member. Flat arcuate stop surfaces 52-62 are provided between the compression ramps 24-34 to limit the extent to which the fastener is forced into the base member 16.

Having described specific preferred embodiments of the invention, the following is claimed:

1. A fastener adapted to be received in a member and held against axial and rotational movement relative to the member by interaction between the member and said fastener, said fastener comprising a head section having a central axis, a shank section extending axially outwardly from said head section and having a central axis coincident with the central axis of said head section, said head section having a rim portion which extends radially outwardly from and faces axially outwardly along said shank section, a thread convolution connected with and disposed in a coaxial relationship with said head and shank sections, an annular groove formed in the rim portion of said head section and circumscribing said shank section, a plurality of flat arcuate stop surfaces areas disposed in a spaced apart relationship in a circular array on the rim portion of said head section and circumscribing said shank section, each of said stop surface areas extending radially outwardly from said groove and being disposed in a plane which extends perpendicular to the central axis of said head section, said stop surface areas being engageable with the member to limit the extent of axial movement of said fastener as it is inserted into the member, a plurality of wedge shaped compression ramps disposed on said rim portion of said head section in a circular array circumscribing said shank section and extending radially outwardly from said groove, each of said wedge shaped compression ramps being disposed between and projecting axially outwardly of a pair of said stop surface areas and having a face surface which slopes radially and axially inwardly toward said shank section from a radially outer end portion disposed axially outwardly of the plane containing said stop surface areas, a plurality of side surface areas disposed on said shank section in a circular array having a central axis coincident with the central axis of said shank section, each of said side surface areas extending axially outwardly from said groove to an axially outer end portion of said shank section, said compression ramps being effective to force the material of the member into the groove and around the side surface areas on said shank section as the fastener is inserted into the member to thereby hold said fastener against axial and rotational movement relative to the member, said side surface areas on said shank section intersect at corner portions which extend axially along said shank section, said groove extending radially inwardly of said corner portions to enable the material of the member to be forced into portions of said groove at locations radially inwardly of said corner portions to hold said fastener against axial movement, said groove having a radially inner side surface which extends tangentially to a central portion of each of said surface areas on said shank section.

2. A fastener as set forth in claim 1 wherein said annular groove has a radially outer side surface which extends at an acute angle to the plane containing the stop surface areas, said face surfaces on said compression ramps being formed as continuations of said radially outer side surface of said groove and extending at the same acute angle relative to the plane containing said stop surface areas as said side surface of said annular groove.

3. A fastener as set forth in claim 1 wherein said groove has a radially outer side surface which extends radially outwardly of the corner portions on said shank section.

4. A fastener as set forth in claim 1 wherein said head section has a polygonal configuration, one of said compression ramps extending inwardly toward said shank section from a corner of said polygonal head section, another one of said compression ramps extending inwardly toward said shank section from a straight side of said polygonal head section.

5. A fastener as set forth in claim 1 wherein said head section has a circular configuration, each of said compression ramps extending radially inwardly from the periphery of said head section toward said shank section.

6. A fastener as set forth in claim 1 wherein said stop surface areas have an arcuate extent which is at least twice as great as the arcuate extent of said compression ramps about the center of said shank section.

7. A fastener as set forth in claim 1 wherein each of said compression ramps has a pair of parallel wedge shaped side surfaces which extend perpendicular to the plane containing said stop surface areas.

8. A fastener as set forth in claim 1 wherein said head section has a periphery with a polygonal configuration with a number of corners which is greater than the number of compression ramps.

9. A fastener as set forth in claim 1 wherein said stop surface areas and said compression ramps extend radially outwardly from said annular groove to the periphery of said head section.

10. A fastener adapted to be received in a member and held against axial and rotational movement relative to the member by interaction between the member and said fastener, said fastener comprising a head section having a central axis, a shank section extending axially outwardly from said head section and having a central axis coincident with the central axis of said head section, said head section having a rim portion which extends radially outwardly from and faces axially outwardly along said shank section, a thread convolution connected with and disposed in a coaxial relationship with said head and shank sections, an annular groove formed in the rim portion of said head section and circumscribing said shank section, a plurality of flat arcuate stop surfaces areas disposed in a spaced apart relationship in a circular array on the rim portion of said head section and circumscribing said shank section, each of said stop surface areas extending radially outwardly from said groove and being disposed in a plane which extends perpendicular to the central axis of said head section, said stop surface areas being engageable with the member to limit the extent of axial movement of said fastener as it is inserted into the member, said annular groove having a radially outer side surface which extends at an acute angle to the plane containing the stop surface areas and which intersects the plane containing said stop surface areas along a circular line of intersection which defines radially innermost ends of said stop surface areas, a plurality of wedge shaped compression ramps disposed on said rim portion of said head section in a circular array circumscribing said shank section and extending radially outwardly from said groove, each of said wedge shaped compression ramps being disposed between and projecting axially outwardly of a pair of said stop surface areas and having a face surface which slopes radially and axially inwardly toward said shank section from a radially outer end portion disposed axially outwardly of the plane containing said stop surface areas, said face surfaces on said compression ramps being formed as continuations of said radially outer side surface of said groove and extending at the same acute angle relative to the plane containing said stop surface areas as said side surface of said annular groove, said face surfaces on said compression ramps intersecting said radially outer surface of said groove at the circular line of intersection of said stop surface areas with said radially outer side surface of said groove, a plurality of side surface areas disposed on said shank section in a circular array having a central axis coincident with the central axis of said shank section, each of said side surface areas extending axially outwardly from said groove to an axially outer end portion of said shank section, said side surface areas on said shank section intersecting at corner portions which extend axially along said shank section, said compression ramps being effective to force the material of the member into the groove and around the side surface areas on said shank section as the fastener is inserted into the member to thereby hold said fastener against axial and rotational movement relative to the member, said groove extending radially inwardly of said corner portions to enable the material of the member to be forced into portions of said groove at locations radially inwardly of said corner portions to hold said fastener against axial movement.

* * * * *